United States Patent Office 2,809,091
Patented Oct. 8, 1957

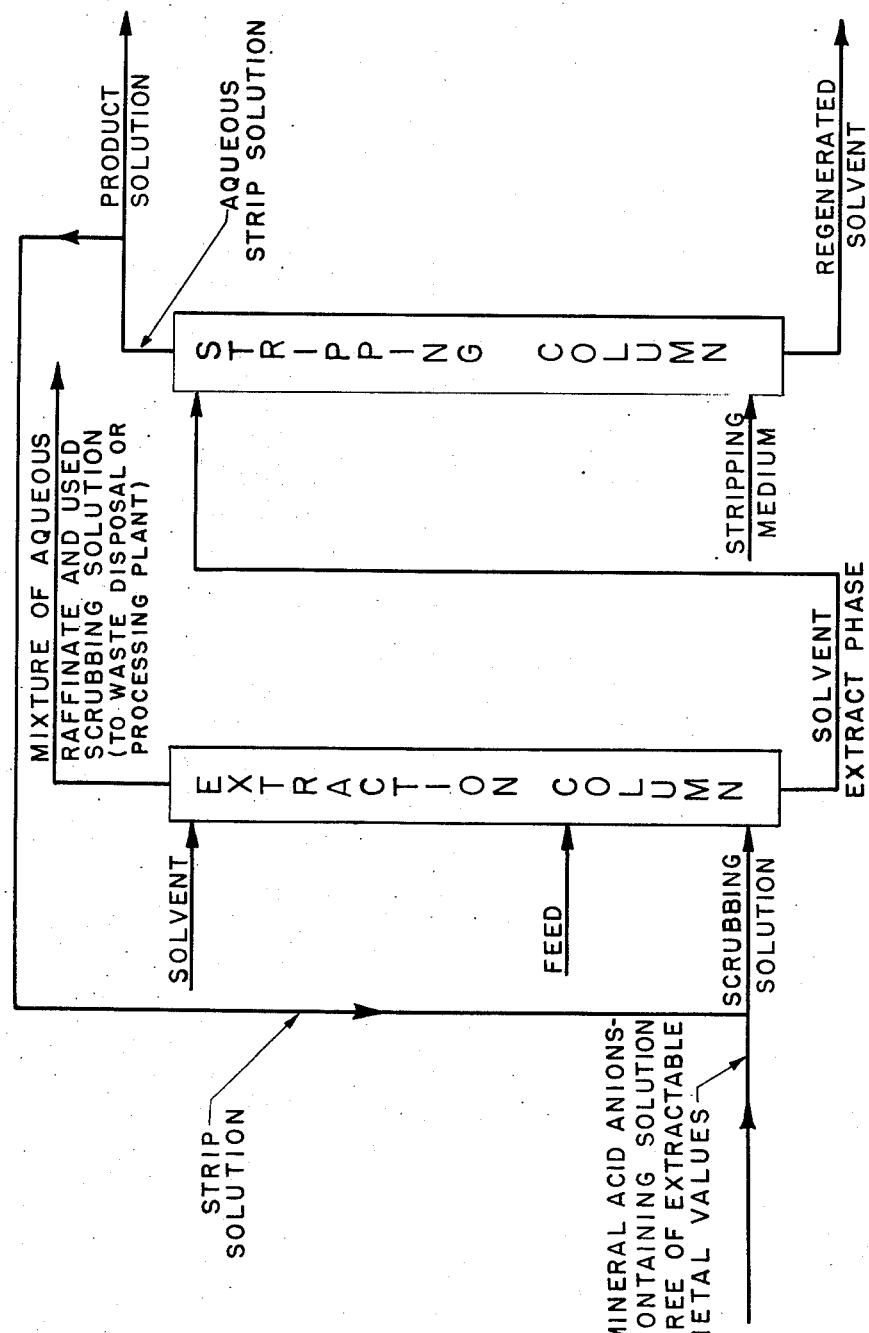

2,809,091

SOLVENT EXTRACTION PROCESS

Albert A. Jonke, Elmhurst, Ill., assignor to the United States of America as represented by the United States Atomic Energy Commission Application May 25, 1954, Serial No. 432,336

9 Claims. (Cl. 23—14.5)

This invention deals with an improved solvent extraction process, and in particular with the extraction of metal values from highly dilute aqueous solutions.

The usual procedure in the separation of metal values from an aqueous solution by selective solvent extraction comprises contacting the aqueous solution with an organic substantially water-immiscible solvent which preferentially extracts only one or some of the metal values present, while other metal values preferentially remain in the aqueous solution; separating phases; scrubbing the extract phase obtained with an aqueous solution containing mineral acid anions but being free from any of the metal values to be separated in order to remove from the extract phase any of the preferentially non-extractable metal values that might have been coextracted; separating the extract phase from the aqueous raffinate and the used scrubbing solution; and finally back-extracting or stripping the preferentially extractable metal values from the organic solvent (thereby regenerating the latter) by contacting with an aqueous medium, preferably water. This sequence of operation is principally the same, whether the process is effected by the use of batch, continuous batch, batch countercurrent or continuous countercurrent methods. In the case of batch operation the aqueous raffinate and the used scrubbing solution are usually obtained subsequently as two separate solutions, while in a continuous operation the raffinate and used scrubbing solution are withdrawn from the extraction column, for instance, as one aqueous phase.

The solutions obtained of the metal or metals to be recovered, i. e., the solvent solution in the extraction step as well as the aqueous strip solution obtained subsequently in the stripping step, are very dilute when the starting or feed solution is a highly dilute solution; this is often disadvantageous, for instance, when the metal values are to be recovered by precipitation. (Hereinafter the term stripping solution always refers to the solution used for back-extraction, while "strip solution" is to indicate the solution obtained by the back-extraction of metal values from the solvent with an aqueous medium.)

It is an object of this invention to provide a process for the separation of metal values by solvent extraction whereby solutions of comparatively high concentrations are obtained.

It is another object of this invention to provide a process for the selective solvent extraction of metal values from aqueous solutions which yields an increased degree of separation.

These and other objects are accomplished by contacting the aqueous solution containing the metal values to be separated with an organic substantially water-immiscible solvent whereby said metal values are taken up by a solvent extract phase; scrubbing said solvent extract phase with an aqueous scrubbing solution; separating said solvent extract phase from said aqueous solution; and contacting the solvent phase with an aqueous medium whereby the extracted metal values are removed from said solvent phase and taken up by said medium to form a strip solution containing said metal values, said aqueous scrubbing solution being a mixture of strip solution and an aqueous mineral acid anions-containing solution which is free of said metal values. By this arrangement the scrub phase of the extraction process is utilized for the enrichment of the metal values in the strip, or product, solution.

The process of this invention is applicable to the recovery of a great many metal values, and particularly well applicable to metals having an even atomic number between 91 and 95. Thus, for example, it lends itself very well to the recovery of metals which are present in low concentrations in ore processing solutions. Uranium salts can be recovered satisfactorily from monazite sand processing solutions wherein the uranium usually occurs in rather low concentrations. The separation of plutonium from fission product values can be achieved by subjecting solutions obtained by processing neutron-irradiated uranium to the process of this invention. These are merely a few examples of the many applicabilities of this invention.

All kinds of equipment customary in solvent extraction processes and known to those skilled in the art may be used for carrying out the process of this invention. Continuous countercurrent operation using one extraction column and one stripping column is the most efficient, and therefore the preferred, procedure. Details on such a continuous countercurrent extraction process may be found in the copending application, Serial No. 303,692, filed on August 11, 1952 by Charles V. Ellison et al.

In the attached drawing a diagrammatic illustration is given of the apparatus and the procedure preferred for carrying out the process of this invention. Two columns were used: an extraction column, part of which was made the scrubbing section, and a stripping column. In the instance illustrated a solvent was employed that had a higher specific gravity than the feed solution and, in order to obtain countercurrent flow, the solvent was introduced near the top of the column, the feed at a lower point near about the center of the colmun, and the scrubbing solution near the bottom of the column. It will be understood that in the case of a solvent lighter than the feed solution the introduction points will be reversed with respect to solvent and scrubbing solution. It is also obvious from the drawing that in both columns a counterflow of the liquids results. In the extraction column the feed introduced at an intermediary point between top and bottom of the column flows upwardly while the solvent flows in the downward direction; by the countercurrent flow an especially thorough contact between the two liquids is obtained. The solvent when flowing past the point of feed introduction comes in contact with the scrubbing solution which flows upwardly. The used scrubbing solution at the point of feed introduction mixes with the feed and the mixture passes upward to become an aqueous raffinate, and this mixture is withdrawn at the top of the column, while the solvent extract phase is withdrawn at the bottom of the column and introduced near the top of the stripping column where it is contacted with the water introduced near the bottom. In the stripping column the aqueous strip, or product, solution will settle at the top and the depleted and regenerated solvent at the bottom of the column. The drawing also indicates that the aqueous strip solution from the top of the stripping column is partly withdrawn from the system as a product solution and partly passed to the line for introduction of scrubbing solution to be mixed with fresh mineral acid anions-containing solution to form the scrubbing solution for the extraction column.

Of course, the recycled strip solution and the fresh mineral acid anions-containing solution may also be introduced separately into the column near the bottom whereby mixing then takes place during the scrubbing operation.

In the following, an example is given to illustrate the improvement obtained by the process of this invention. It will be understood that the invention is not to be limited to the details given in this example.

EXAMPLE

An aqueous nitric acid solution of uranyl nitrate was extracted with a mixture of tributyl phosphate (hereinafter referred to as TBP) and carbon tetrachloride in a so-called pulse column, wherein contact of aqueous solution and organic extractant is intensified by pulsation of the liquids. A pulse column is described and claimed in copending application Serial No. 325,003, filed on December 9, 1952 by Leland L. Burger and granted as Patent No. 2,743,170 on April 24, 1956. In the experiment now described the bottom of the extraction column was used for scrubbing by introducing the feed and scrub solutions, as shown in the drawing forming part of this specification, and, of course, upflowing scrubbing solution mixed with feed at the latter's introduction point. Back-extraction of the uranium from the tributyl phosphate mixture was carried out in a second pulse column. Four runs were carried out under comparable conditions, except that one run was made without recycling, while in runs 2, 3, and 4 the respective strip solutions obtained in the second column were introduced into the scrubbing section of the first column; the flow rate of the stripping solution was also varied in each of these three runs.

The extraction column consisted of a Pyrex pipe having an inside diameter of 0.75 inch, a four-foot long extraction section and a two-foot long scrubbing section. The solvent was introduced near the top of the column, the scrubbing solution near the bottom and the feed solution above the introduction point for the scrubbing solution at a distance four feet from the bottom. The second, stripping, column had about the same dimensions; the solvent extract phase from the first column was introduced near the top of the stripping column, the stripping water near the bottom. Both columns were packed with perforated plates 0.005-in. thick, each of which contained 72 holes of 0.035-in. diameter; the plates were spaced in 1.5-inch intervals. The liquids were pulsed with 100 strokes per minute. Each run was carried out for about three hours.

The compositions and flow rates of the various solutions are given in Table I.

*Table I*

|  | Stream Compositions | Stream Rates |
|---|---|---|
| Feed | 0.10 M in uranyl nitrate hexahydrate, 3.1 M in $HNO_3$. | 60 ml./min. |
| Extractant | $CCl_4$ 0.44 M in TBP | 50 ml./min. |
| Scrubbing solution | 8.3 ml. of strip solution combined with 1.8 ml. of 15.6 N $HNO_3$ to provide a nitric acid concentration of about 3 N. | 10 ml./min. |
| Stripping solution | Distilled water | As indicated in Table II. |

The results of the four runs are compiled in Table II.

This example shows that the uranium losses are not increased in the extraction column or in the stripping column by recycling of metal values by passing part of the strip solution according to this invention. It is also evident from Table II that both, recycling and flow rate decrease of the stripping solution, result in an increase of the concentration of the final aqueous product solution.

In an actual plant process the following procedure is advantageously employed. When the extraction system is first started, reflux of the total quantity of strip solution is used, i. e., all of the aqueous solution obtained by back-extraction of the solvent phase is introduced into the scrub stream. The salt concentration and acidity of this stream are, of course, adjusted to the desired conditions. Under this total reflux the concentrations of the extractable metal, or meals, in the organic extract phase and in the aqueous strip solution increase rapidly. When the concentrations have reached a maximum or a desired value, strip solution is removed from the system at approximately the same rate of metal value removal at which the metal values are freshly introduced as feed, while the remainder of the strip solution is admixed with the scrub solution according to this invention.

It will be understood that this invention is not to be limited to the details given herein but that it may be modified within the scope of the appended claims.

This application is a continuation-in-part of application Serial No. 312,647, filed by the inventor on October 1, 1952, now abandoned.

What is claimed is:

1. A process of recovering metal values from an aqueous dilute solution thereof, comprising contacting said aqueous solution with an organic substantially water-immiscible solvent whereby said metal values are taken up by a solvent extract phase; scrubbing said solvent extract phase with an aqueous scrubbing solution; separating an aqueous solution from said scrubbed solvent extract phase; and contacting the scrubbed solvent phase with an aqueous medium whereby the extracted metal values are removed from said solvent phase and taken up by said medium to form a strip solution containing said metal values, said aqueous scrubbing solution being a mixture of strip solution and an aqueous solution which contains mineral acid anions and is free of said metal values.

2. The process of claim 1 wherein the solvent contains alkyl phosphate.

3. The process of claim 2 wherein the alkyl phosphate is trialkyl phosphate.

4. The process of claim 3 wherein the trialkyl phosphate is tributyl phosphate.

5. The process of claim 1 wherein the solvent is hexone.

6. The process of claim 1 wherein the aqueous dilute solution is a nitric acid solution, and the scrub solution contains nitric acid.

7. A process of separating values of metals having an even atomic number between 91 and 95 from rare earth

*Table II*

| Run No. | Stripping Solution Rate, ml./min. | Uranium Losses | | | | Product Stream Composition M, U | | Uranium in Aq. Extract, Percent of Feed |
|---|---|---|---|---|---|---|---|---|
|  |  | Compositions, M $UO_2(NO_3)_2 \cdot 6H_2O$ | | Percent of Feed | | | | |
|  |  | Aq. waste from extn. column | TBP effluent from stripg. col. | Aq. waste from extn. column | TBP effluent from stripg. col. | Calc'd. | Actual | |
| 1 | 50 | $1.1 \times 10^{-5}$ | $2.1 \times 10^{-5}$ | 0.013 | 0.018 | 0.118 | 0.136 | 115 |
| 2 | 40 | $1.0 \times 10^{-5}$ | $1.1 \times 10^{-5}$ | 0.012 | 0.009 | 0.183 | 0.172 | 94 |
| 3 | 30 | $6.7 \times 10^{-7}$ | $1.5 \times 10^{-5}$ | 0.0008 | 0.012 | 0.264 | 0.268 | 100 |
| 4 | 25 | $5.7 \times 10^{-7}$ | $1.0 \times 10^{-5}$ | 0.0007 | 0.009 | 0.338 | 0.323 | 95 | metal values contained in an aqueous nitric acid solution, comprising contacting said aqueous solution with an organic substantially water-immiscible solvent whereby said metal values are taken up by a solvent extract phase while said rare earth metal values remain in said aqueous solution; scrubbing said solvent extract phase with a nitric acid-containing aqueous scrubbing solution; separating the scrubbed solvent phase from an aqueous solution; contacting said scrubbed solvent phase with water whereby the extracted metal values are removed from said solvent phase and taken up by said water to form a strip solution containing said metal values, said scrubbing solution being a mixture of said strip solution and of aqueous nitric acid which is free of said metal values.

8. A process of separating uranium values from rare earth metal values contained in an aqueous nitric acid solution, comprising contacting said aqueous solution with an organic substantially water-immiscible solvent whereby said uranium values are taken up by a solvent extract phase while said rare earth metal values remain in said aqueous solution; scrubbing said solvent extract phase with a nitric acid-containing aqueous scrubbing solution; separating the scrubbed solvent phase from an aqueous solution; contacting said scrubbed solvent phase with water whereby the extracted uranium values are removed from said solvent phase and taken up by said water to form a strip solution containing said uranium values, said scrubbing solution being a mixture of said strip solution and aqueous uranium-free nitric acid.

9. A process of separating uranium values from an aqueous nitric acid feed solution of uranyl nitrate, comprising contacting said aqueous solution with a solution of tributyl phosphate in carbon tetrachloride whereby said uranium values are taken up by a solvent extract phase; scrubbing said solvent extract phase with a nitric acid-containing aqueous scrubbing solution; separating the scrubbed solvent phase from an aqueous solution; contacting said solvent phase with water whereby the extracted uranium values are removed from said solvent phase and taken up by said water to form a strip solution containing said uranium values, the value ratios of said feed solution : tributyl phosphate solution : scrubbing solution : water being 6 : 5 : 1 : 2.5 to 4 and said scrubbing solution being a mixture of 8.3 parts by volume of said strip solution and 1.8 parts by volume of aqueous nitric acid.

No references cited.